(12) United States Patent
Lansdale et al.

(10) Patent No.: US 8,702,507 B2
(45) Date of Patent: Apr. 22, 2014

(54) MANUAL AND CAMERA-BASED AVATAR CONTROL

(75) Inventors: Thomas William Lansdale, Guildford (GB); Charles Robert Griffiths, Guildford (GB)

(73) Assignee: Microsoft Corporation, Redmond, WA (US)

( * ) Notice: Subject to any disclaimer, the term of this patent is extended or adjusted under 35 U.S.C. 154(b) by 232 days.

(21) Appl. No.: 13/237,714

(22) Filed: Sep. 20, 2011

(65) Prior Publication Data

US 2012/0276995 A1   Nov. 1, 2012

Related U.S. Application Data

(60) Provisional application No. 61/480,089, filed on Apr. 28, 2011.

(51) Int. Cl.
*A63F 9/24* (2006.01)
*A63F 13/06* (2006.01)

(52) U.S. Cl.
USPC .......................................................... 463/31

(58) Field of Classification Search
None
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

"International Search Report", Mailed Date: Nov. 20, 2012, Application No. PCT/US2012/034726, Filed Date: Apr. 23, 2012, pp. 13.

(Continued)

*Primary Examiner* — David L Lewis
*Assistant Examiner* — Shauna-Kay Hall
(74) *Attorney, Agent, or Firm* — Micah Goldsmith; Glen Johnson; Micky Minhas

(57) ABSTRACT

Manual and camera-based avatar control is described for example, in computer game systems. In one embodiment, an image capture system tracks motion of a player's arm holding a real world object and the player also makes input to the game system at the same time, using a manual controller. In an example, tracked motion of a player's arm is used to control aim of a virtual dart in a game display and the player makes manual input at the controller to fire the dart. In various embodiments, position of a part of a player is detected and mapped to screen space using a mapping function which may vary. For example, a mapped position of a player's hand in screen space is used to control the position of an avatar's hand by extending the avatar's arm. In examples, conditions are met before camera-based control of an avatar.

20 Claims, 9 Drawing Sheets

(56) References Cited

U.S. PATENT DOCUMENTS

| | | |
|---|---|---|
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,697,072 B2 | 2/2004 | Russell et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,229,349 B2 | 6/2007 | Yamada |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |

(56) References Cited

U.S. PATENT DOCUMENTS

| | | | |
|---|---|---|---|
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2002/0041327 A1* | 4/2002 | Hildreth et al. | 348/42 |
| 2005/0059488 A1 | 3/2005 | Larsen et al. | |
| 2005/0215319 A1* | 9/2005 | Rigopulos et al. | 463/32 |
| 2008/0026838 A1 | 1/2008 | Dunstan et al. | |
| 2008/0215974 A1 | 9/2008 | Harrison et al. | |
| 2008/0242409 A1 | 10/2008 | Schueller | |
| 2008/0280684 A1 | 11/2008 | McBride et al. | |
| 2009/0009469 A1 | 1/2009 | Hsu et al. | |
| 2009/0027337 A1 | 1/2009 | Hildreth | |
| 2009/0048021 A1 | 2/2009 | Lian et al. | |
| 2009/0150802 A1 | 6/2009 | Do et al. | |
| 2009/0209343 A1* | 8/2009 | Foxlin et al. | 463/36 |
| 2009/0217211 A1* | 8/2009 | Hildreth et al. | 715/863 |
| 2010/0053151 A1 | 3/2010 | Marti et al. | |
| 2010/0151942 A1 | 6/2010 | Horovitz | |
| 2010/0302247 A1 | 12/2010 | Perez et al. | |
| 2010/0302253 A1 | 12/2010 | Kipman et al. | |
| 2010/0303289 A1 | 12/2010 | Polzin et al. | |
| 2010/0306715 A1 | 12/2010 | Geisner et al. | |
| 2011/0007079 A1 | 1/2011 | Perez et al. | |
| 2012/0088581 A1 | 4/2012 | Mao et al. | |

FOREIGN PATENT DOCUMENTS

| | | |
|---|---|---|
| JP | 08044490 A1 | 2/1996 |
| KR | 1020110002102 A | 1/2011 |
| WO | 93/10708 A1 | 6/1993 |
| WO | 97/17598 A1 | 5/1997 |
| WO | 99/44698 A1 | 9/1999 |
| WO | 2007038622 A2 | 4/2007 |

OTHER PUBLICATIONS

Stephen Totilo, "Kung Fu Live Is the Best Kinect Game on PlayStation 3", Sep. 2010, pp. 1-3, http://kotaku.com/5630997/kung-fu-live-is-the-best-kinect-game-on-playstation-3.

Jose L. Bernardes, et al, "Design and implementation of a flexible hand gesture command interface for games based on computer vision", VIII Brazilian Symposium on Games and Digital Entertainment, Oct. 2009, pp. 1-10, Rio de Janeiro, Brazil.

Stefan Waldherr, et al "Template-Based Recognition of Pose and Motion Gestures on a Mobile Robot", Carnegie Mellon University, 1998, pp. 1-6, Pittsburgh, PA.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "CONDENSATION—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

* cited by examiner

MANUAL AND CAMERA-BASED AVATAR CONTROL

CROSS-REFERENCE TO RELATED APPLICATION

This non-provisional utility application claims priority to U.S. provisional application Ser. No. 61/480,089, entitled "Manual and Camera-based Avatar Control" and filed on Apr. 28, 2011, which is incorporated herein in its entirety by reference.

BACKGROUND

Existing video and computer game control systems use hand held controllers which incorporate buttons and joysticks to enable a player to control an avatar or other objects depicted at a game display. Design of these types of hand held controllers seeks to enable fine grained control of game play in robust, easy to use and intuitive manners.

More recently, some computer game control systems use voice recognition technology and gesture recognition to enable a player to control a game interface. In this situation gamers have no hand held controller and are able to interact with the game in a straightforward manner without being restricted by physical user input devices such as hand held controllers.

The embodiments described below are not limited to implementations which solve any or all of the disadvantages of known game control systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Manual and camera-based avatar control is described for example, in computer game systems. In one embodiment, an image capture system tracks motion of a player's arm holding a real world object and the player also makes input to the game system at the same time, using a manual controller. In an example, tracked motion of a player's arm is used to control aim of a virtual dart in a game display and the player makes manual input at the controller to fire the dart. In various embodiments, position of a part of a player is detected and mapped to screen space using a mapping function which may vary. For example, a mapped position of a player's hand in screen space is used to control the position of an avatar's hand by extending the avatar's arm. In various examples, player conditions are met before camera-based control of an avatar.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a game system for two dimensional side-scrolling platformer games, the system described is provided as an example and not a limitation. As those skilled in the art will appreciate, the present examples are suitable for application in a variety of different types of game systems.

Figure 1:
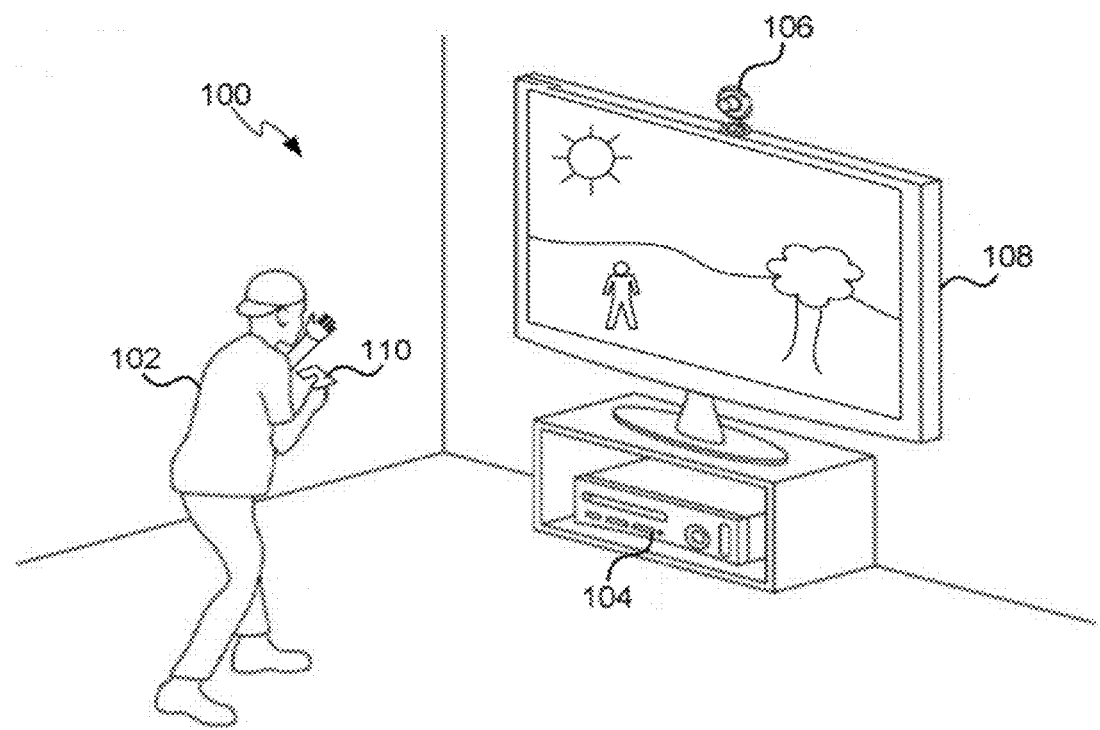
FIG. 1 is a schematic diagram of a player holding a game controller and sitting before a game apparatus having a depth camera.

Reference is first made to FIG. 1, which illustrates an example control system 100 for controlling a computer game. In this example, the control system comprises both a hand-held controller and a camera-based control system. By integrating both types of control a game player experiences the benefits of both types of control system. Integration is achieved as described herein to enable fine grained control of game systems in a robust, easy to use manner which enhances the player experience. FIG. 1 shows a user 102 playing, in this illustrative example, a two dimensional side-scrolling platformer game. This type of game is may be clearly depicted in two dimensional drawings; however, the methods described herein are also applicable to three dimensional games, augmented reality applications and games of other types. In some examples, camera-based control system 100 can be used to, among other things, determine body pose, bind, recognize, analyze, track, associate to a human target, provide feedback, and/or adapt to aspects of a human target such as user 102 (also referred to herein as a player). In this example one player is depicted for clarity. However, two or more players may also use the control system at the same time.

The camera-based control system 100 comprises a computing device 104. The computing device 104 can be a general purpose computer, gaming system or console, or dedicated image processing device. The computing device 104 can include hardware components and/or software components such that the computing device 104 can be used to execute applications such as gaming applications and/or non-gaming applications. The structure of the computing device 104 is discussed hereinafter with reference to FIG. 9.

The camera-based control system 100 further comprises a capture device 106. The capture device 106 can be, for example, an image sensor or detector that can be used to visually monitor one or more users (such as user 102) such that gestures performed by the one or more users can be captured, analyzed, processed, and tracked to perform one or more controls or actions within a game or application, as described in more detail below.

The camera-based control system 100 can further comprise a display device 108 connected to the computing device 104. The computing device can be a television, a monitor, a high-definition television (HDTV), or the like that can provide game or application visuals (and optionally audio) to the user 102.

In operation, the user 102 can be tracked using the capture device 106 such that the position, movements and size of user 102 can be interpreted by the computing device 104 (and/or the capture device 106) as controls that can be used to affect the application being executed by computing device 104. As a result, the user 102 can move his or her body (or parts of his or her body) to control an executed game or application.

In the illustrative example of FIG. 1, the application executing on the computing device 104 is a two dimensional side-scrolling platformer game that the user 102 is playing. In this example, the computing device 104 controls the display device 108 to provide a visual representation of a terrain comprising a landscape, tree, and the sun to the user 102. The computing device 104 also controls the display device 108 to provide a visual representation of a user avatar that the user 102 can control with his or her movements and/or by using a hand held controller 110. An avatar can be a visual representation of a character and/or a tool, weapon or other object which the avatar is depicted as controlling. For example, the computing device 104 can comprise a body pose estimator that is arranged to recognize and track different body parts of the user, and map these onto the avatar. In this way, the avatar copies the movements of the user 102 such that if the user 102, for example walks in physical space, this causes the user avatar to walk in game space.

However, only copying user movements in game space limits the type and complexity of the interaction between the user and the game. For example, many in-game controls are momentary actions or commands, which may be triggered using button presses in traditional gaming systems. Examples of these include actions such as punch, shoot, change weapon, throw, kick, jump, and/or crouch. Such actions or commands may be controlled by recognizing that the user is performing one of these actions and triggering a corresponding in-game action, rather than merely copying the user's movements. In addition, combinations of user inputs at the hand held controller and user inputs via the camera-based control system may be used to control the game apparatus.

Figure 2:
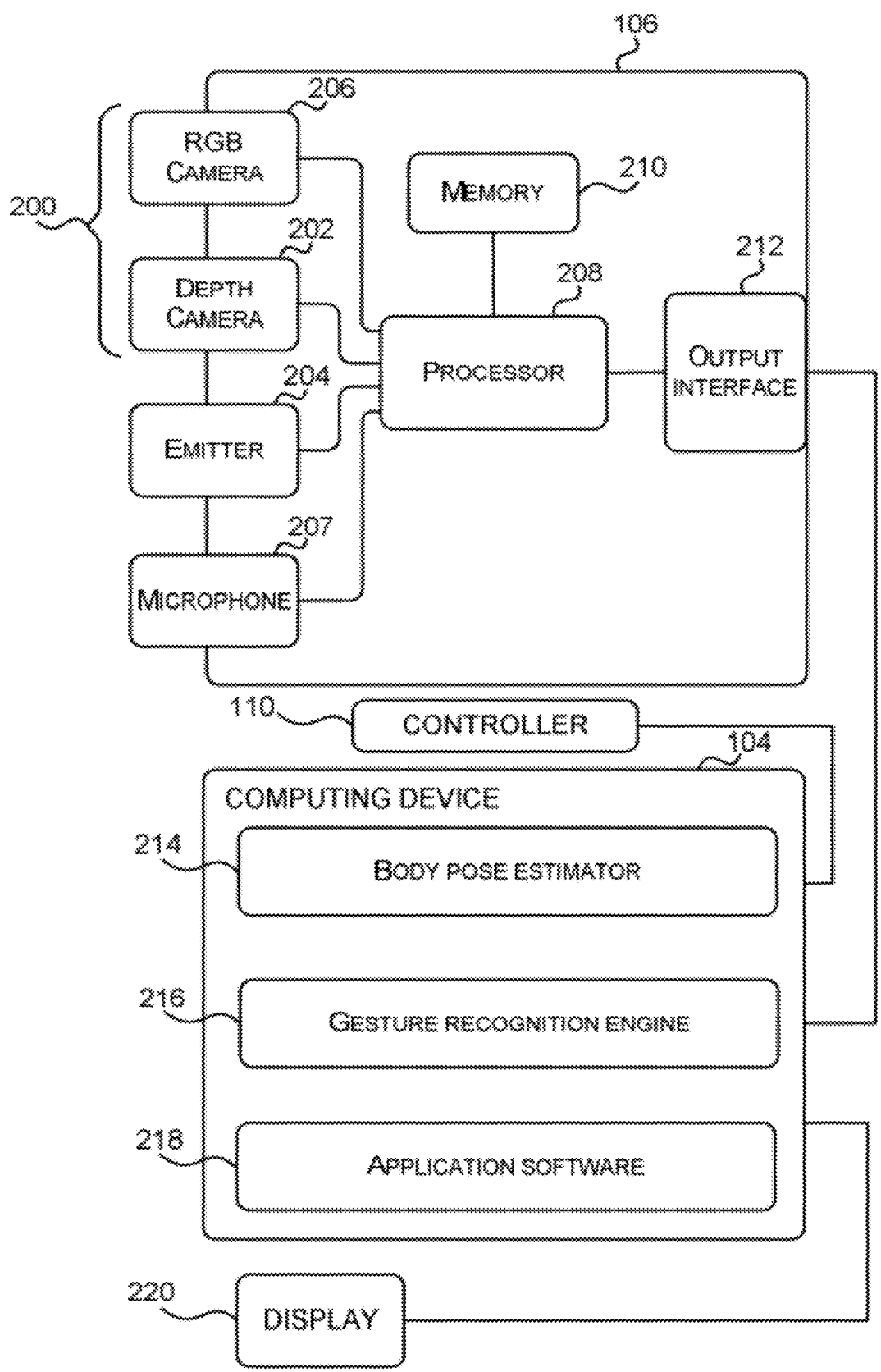
FIG. 2 is a schematic diagram of a game system incorporating an image capture device, a hand held controller, a computing device and a display.

Reference is now made to FIG. 2, which illustrates a schematic diagram of the capture device 106 that can be used in the camera-based control system 100 of FIG. 1. In the example of FIG. 2 the capture device 106 is configured to capture video images with depth information. Such a capture device can be referred to as a depth camera. The depth information can be in the form of a depth image that includes depth values, i.e. a value associated with each image element of the depth image that is related to the distance between the depth camera and an item or object located at that image element. Note that the term "image element" is used to refer to a pixel, group of pixels, voxel, group of voxels or other higher level component of an image.

The depth information can be obtained using any suitable technique including, for example, time-of-flight, structured light, stereo image, or the like. In some examples, the capture device 106 can organize the depth information into "Z layers," or layers that may be perpendicular to a Z-axis extending from the depth camera along its line of sight.

As shown in FIG. 2, the capture device 106 comprises at least one imaging sensor 200. In the example shown in FIG. 2, the imaging sensor 200 comprises a depth camera 202 arranged to capture a depth image of a scene. The captured depth image can include a two-dimensional (2-D) area of the captured scene where each image element in the 2-D area represents a depth value such as a length or distance of an object in the captured scene from the depth camera 202.

The capture device can also include an emitter 204 arranged to illuminate the scene in such a manner that depth information can be ascertained by the depth camera 202. For example, in the case that the depth camera 202 is an infra-red (IR) time-of-flight camera, the emitter 204 emits IR light onto the scene, and the depth camera 202 is arranged to detect backscattered light from the surface of one or more targets and objects in the scene. In some examples, pulsed infrared light can be emitted from the emitter 204 such that the time between an outgoing light pulse and a corresponding incoming light pulse can be detected by the depth camera and measured and used to determine a physical distance from the capture device 106 to a location on the targets or objects in the scene. Additionally, in some examples, the phase of the outgoing light wave from the emitter 204 can be compared to the phase of the incoming light wave at the depth camera 202 to determine a phase shift. The phase shift can then be used to determine a physical distance from the capture device 106 to a location on the targets or objects. In a further example, time-of-flight analysis can be used to indirectly determine a physical distance from the capture device 106 to a location on the targets or objects by analyzing the intensity of the reflected beam of light over time via various techniques including, for example, shuttered light pulse imaging.

In another example, the capture device 106 can use structured light to capture depth information. In such a technique, patterned light (e.g., light displayed as a known pattern such as spot, grid, or stripe pattern, which may also be time-varying) can be projected onto the scene using the emitter 204. Upon striking the surface of one or more targets or objects in the scene, the pattern becomes deformed. Such a deformation of the pattern can be captured by the depth camera 202 and then be analyzed to determine a physical distance from the capture device 106 to a location on the targets or objects in the scene.

In another example, the depth camera 202 can be in the form of two or more physically separated cameras that view a scene from different angles, such that visual stereo data is obtained that can be resolved to generate depth information. In this case the emitter 204 can be used to illuminate the scene or can be omitted.

In some examples, in addition or alterative to the depth camera 202, the capture device 106 can comprise a video camera, which is referred to as an RGB camera 206. The RGB camera 206 is arranged to capture sequences of images of the scene at visible light frequencies, and can hence provide images that can be used to augment the depth images. In some examples, the RGB camera 206 can be used instead of the depth camera 202. The capture device 106 can also optionally comprise a microphone 207 or microphone array (which can be directional and/or steerable), which is arranged to capture sound information such as voice input from the user and can be used for speech recognition.

The capture device 106 shown in FIG. 2 further comprises at least one processor 208, which is in communication with the imaging sensor 200 (i.e. depth camera 202 and RGB camera 206 in the example of FIG. 2), the emitter 204, and the microphone 207. The processor 208 can be a general purpose microprocessor, or a specialized signal/image processor. The processor 208 is arranged to execute instructions to control the imaging sensor 200, emitter 204 and microphone 207 to capture depth images, RGB images, and/or voice signals. The processor 208 can also optionally be arranged to perform processing on these images and signals, as outlined in more detail hereinafter.

The capture device 106 shown in FIG. 2 further includes a memory 210 arranged to store the instructions that for execution by the processor 208, images or frames of images captured by the depth camera 202 or RGB camera 206, or any other suitable information, images, or the like. In some examples, the memory 210 can include random access memory (RAM), read only memory (ROM), cache, Flash memory, a hard disk, or any other suitable storage component. The memory 210 can be a separate component in communication with the processor 208 or integrated into the processor 208.

The capture device 106 also comprises an output interface 212 in communication with the processor 208 and is arranged to provide data to the computing device 104 via a communication link. The communication link can be, for example, a wired connection (such as USB, Firewire, Ethernet or similar) and/or a wireless connection (such as WiFi, Bluetooth® or similar). In other examples, the output interface 212 can interface with one or more communication networks (such as the internet) and provide data to the computing device 104 via these networks.

A controller 110 is also provided as part of the capture device. The controller may be a hand held controller as depicted schematically in FIG. 1 or may be integral with another larger device that is not hand held. The controller comprises a plurality of user input devices such as buttons, joysticks, touch pads, switches and enables a player to make input to a game system. User input data is sent from the controller to the computing device 104 by a wired connection and/or a wireless connection.

The computing device 104 executes a number of functions relating to the camera-based gesture recognition, such as an optional body pose estimator 214 and a gesture recognition engine 216. The body pose estimator 214 is arranged to use computer vision techniques to detect and track different body parts of the user.

An example of a body pose estimator is given in US patent publication US-2010-0278384-A1 "Human body pose estimation" filed 20 May 2009. The body pose estimator 214 can provide an output to the gesture recognition engine in the form of a time-series of data relating to the user's body pose. This can be in the form of a fully tracked skeletal model of the user, or a more coarse identification of the visible body parts of the user. For example, these time-series sequences can comprise data relating to a time-varying angle between at least two body parts of the user, a rate of change of angle between at least two body parts of the user, a motion velocity for at least one body part of the user, or a combination thereof The different types of data (angles between certain body parts, velocities, etc.) are known as "features". In other examples, the body pose estimator 214 can derive other data sequences (i.e. other features) from the changing pose of the user over time. In further examples, the gesture recognition engine 216 can utilize input (i.e. features) derived from different sources other than the body pose estimator. Application software 218 can also be executed on the computing device 104 and controlled using the gestures. The application software is arranged to control display of the game at a display 220.

Figure 3:
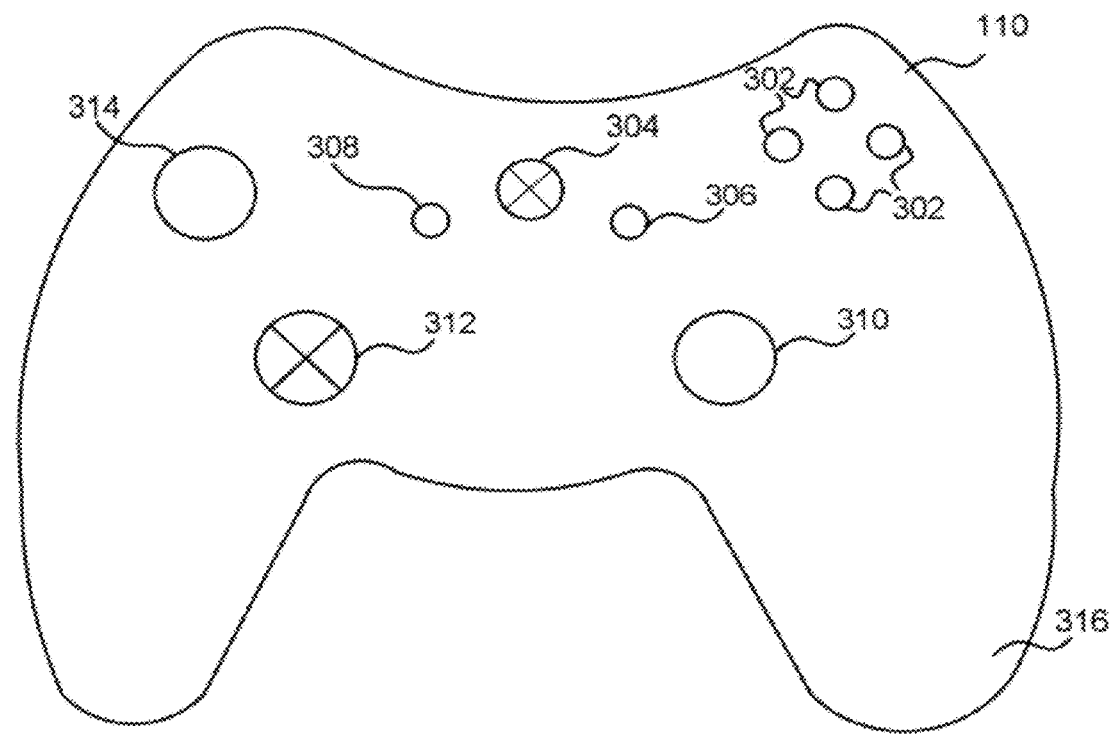
FIG. 3 is a plan view of a hand held controller.

FIG. 3 is a plan view of an example hand held controller 110. It has a generally winged shape with each wing or shoulder 316 being sized and shaped to be clasped in one hand. The controller comprises a housing supporting a plurality of buttons, switches and joysticks as now described in more detail. However, this is an example only and other types of controller 110 may be used.

Four digital actions buttons 302 are provided on the right face of the controller comprising a green A button, red B button, blue X button and amber Y button. Two analog joysticks 310 and 312 are provided. These joysticks may also be depressed or clicked in to active a digital button beneath each joystick. Digital start 306, back 308 and guide 304 buttons are centrally positioned on the housing. For example, the guide button is used to turn on the controller and access a menu.

Figure 4:
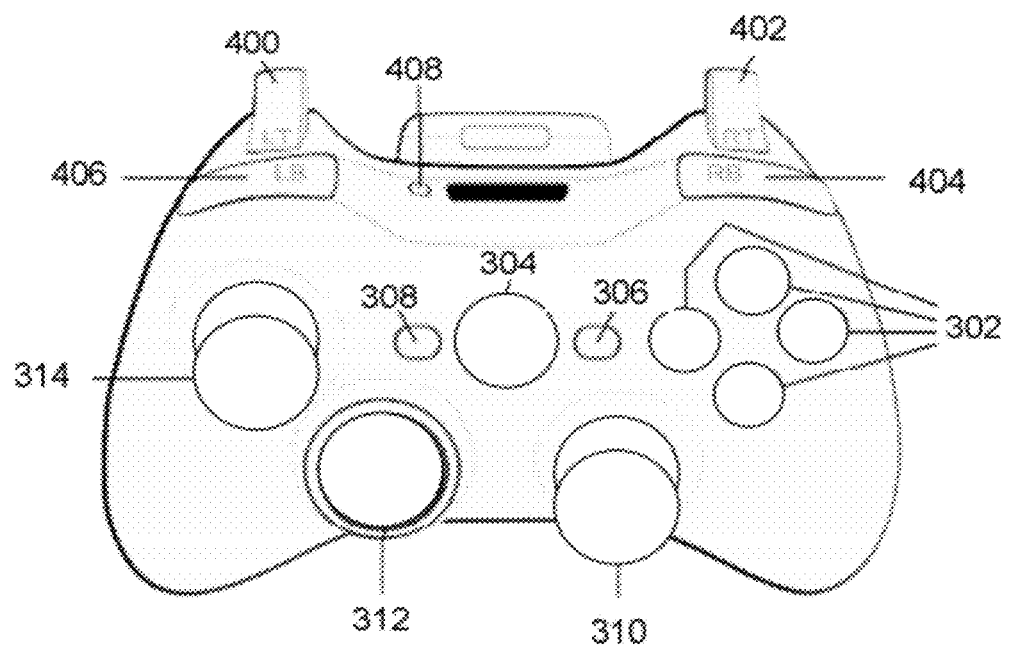
FIG. 4 is a perspective view of the hand held controller of FIG. 3.

FIG. 4 is a perspective view of the controller and shows a left bumper 406 and a right bumper 404 each of which are buttons that may be pressed by the user. A left trigger 400 and a right trigger 402 which are both analog are given on the underside of the controller (visible in FIG. 4). A connect 408 may be provided to enable wired connection to the computing device 104.

Figure 5:
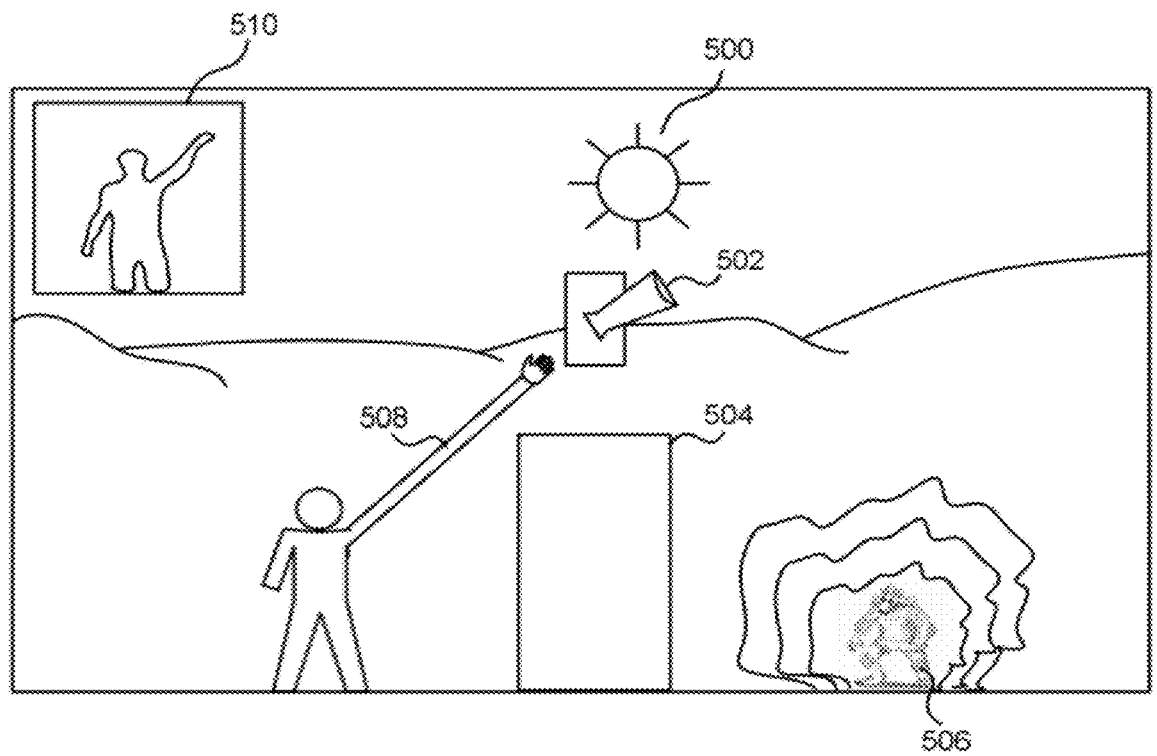
FIG. 5 is a schematic diagram of a display during game play.

FIG. 5 is a schematic diagram of a display during game play, for example at display screen 108 of FIG. 1. An avatar is shown in an environment comprising a landscape and a sun 500. The environment comprises a plurality of active objects which may influence the course of the game. In this example, the active objects comprise an enemy 506 surrounded by an attack cloud, and a door handle 502. An inactive object 504 is an impassable wall and the door handle 502 provides a means for the player to pull the avatar over the wall and continue moving right. Another inactive object 510 is also displayed in a corner of the display and comprises a representation of an image stream currently being captured by the game system and depicting a player of the game. If a plurality of players are using the game system together the image stream depicts all players visible in the image stream depending on any occlusion and the field of view of the image capture system. It is not essential to use inactive object 510. In the example given in FIG. 5 one of the avatar's arms 508 is extended towards the door handle 502. This is achieved by detecting a position of the player's hand in the image stream (relative to screen space) and extending the avatar's arm on the basis of the detected position of the player's hand. It is noted that the scenario of FIG. 5 is one example only. Positions of player's body parts and/or gestures of players may be used to control the avatar in other ways.

Figure 6:
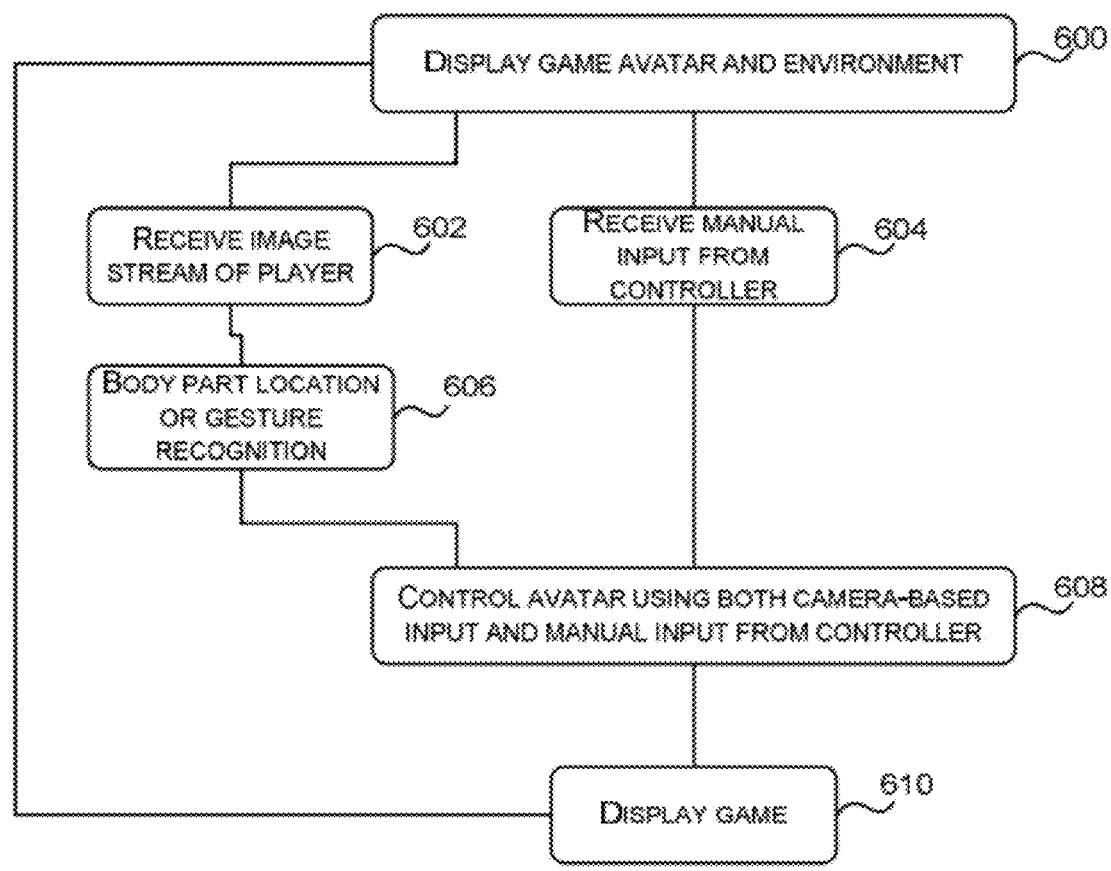
FIG. 6 is a flow diagram of a method of operation of a game system.

FIG. 6 is a flow diagram of a method of operation of a game system. The game system displays 600 a game comprising at least one avatar in an environment. An image stream is received 602 of at least one player of the game and body part positions and/or joint positions are detected 606 in the image stream, for example, using the body pose estimator of FIG. 2. Optionally, gesture recognition is also carried out. Manual input is also received 604 from a controller which may be a hand held controller such as that of FIGS. 3 and 4. The manual input may be received substantially simultaneously with the body part location and gesture recognition. The game system controls the avatar at least on the basis of both the camera-based input and the manual input from the controller. The game is displayed 610 and camera-based input continues to be received in addition to any manual input. The body part location detection and optional gesture recognition is carried out in real time in order that the game play does not lag and the player has an immersive gaming experience.

Figure 7:
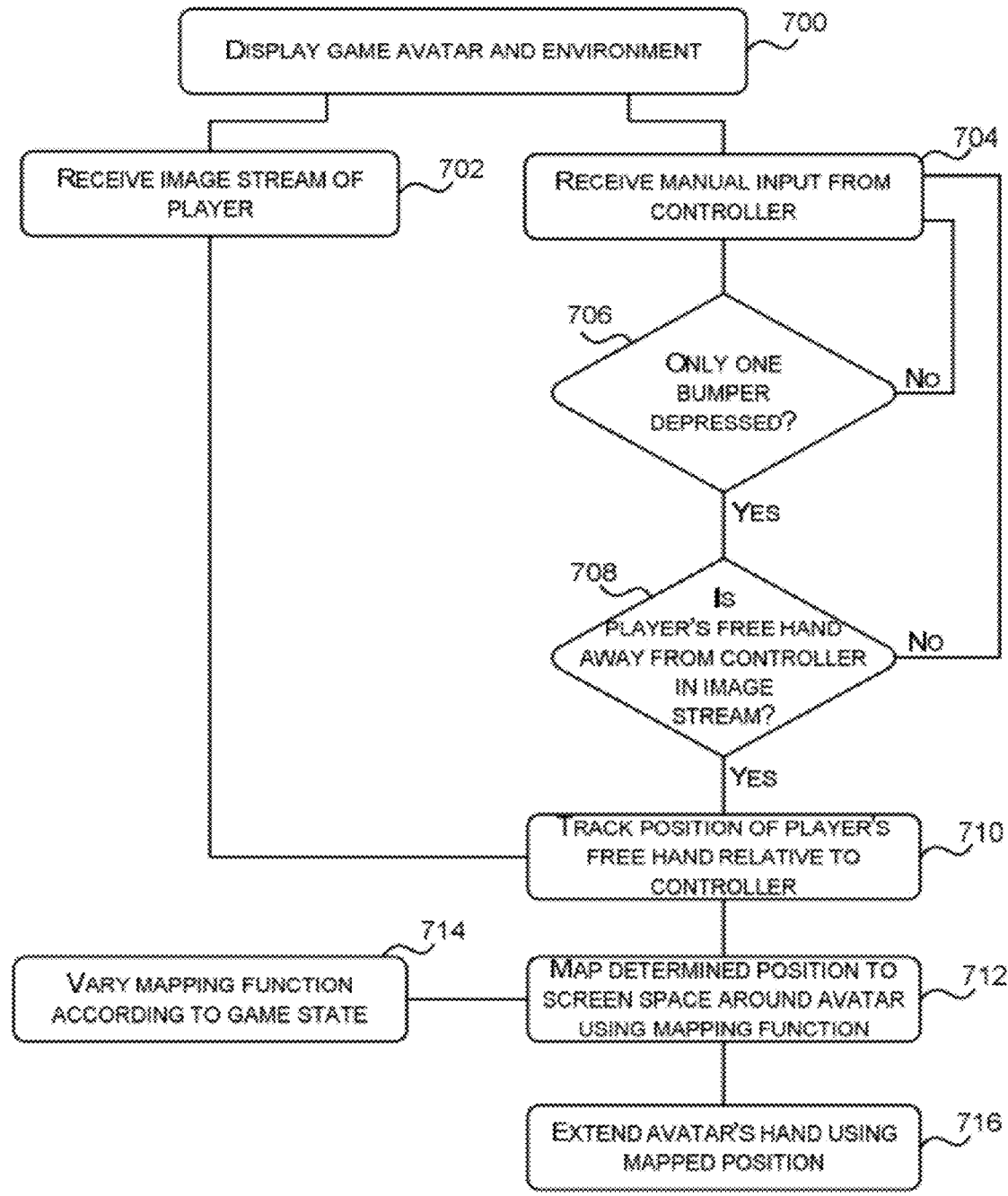
FIG. 7 is a flow diagram of another method of operation of a game system.

FIG. 7 is a flow diagram of a method of operation of a game system in which particular player conditions of manual input and player body part position are met before using camera-based input to control an avatar. In this way hybrid control of the game system is achieved in real-time in a manner which avoids conflicts between the camera-based and manual control, which gives fine grained control and which is intuitive to use. In this example, camera-based control is used to extend an avatar's arm. However, this is only one example. The methods may also be used to control an avatar or other objects in a game in other manners.

The game system displays 700 an avatar in an environment and receives an ongoing image stream of the player using an image capture system such as described above with reference to FIG. 2. Manual input is received 704 from a controller such as the hand held controller of FIGS. 3 and 4 or any other manual controller. A check is made 706 as to whether only one bumper of the controller is depressed. For example, this may be the left or right bumper 406, 404 of FIG. 4. It is not essential to use a bumper. Any button, switch, touch pad or other hand operated user input device may be used which is one of a pair designed for use by a player's hands. If only one bumper is depressed then the game system has information about which of the player's hands is likely to be free. The game system checks 708 the image stream for the hand which is likely to be free and calculates whether the position of the free hand is more than a threshold distance away from the controller. If so, the game system tracks 710 the position of the player's free hand relative to the controller.

The game system maps 712 the determined position of the player's free hand to screen space around the avatar using a mapping function. The mapping function may be stored at the game system and parameters of the mapping function may vary 714 according to the game state. For example, the mapping function may ensure that the mapped position in screen space is within a specified region around the avatar and that the mapped position is related to the determined position of the player's free hand, for example, using a proportional relationship, a non-linear relationship or in other ways. The avatar's arm is then extended 716 such that the avatar's hand is at the mapped position in screen space.

As illustrated by the example of FIG. 7, by ensuring that a manual input condition and a camera-based input condition are both met, conflicts between control of the avatar using either of these two control methods are alleviated. It is not essential to use a manual input condition such as that of 706. The image stream of the player may be used to check whether only one hand of the player is present on the controller for example.

Figure 8:
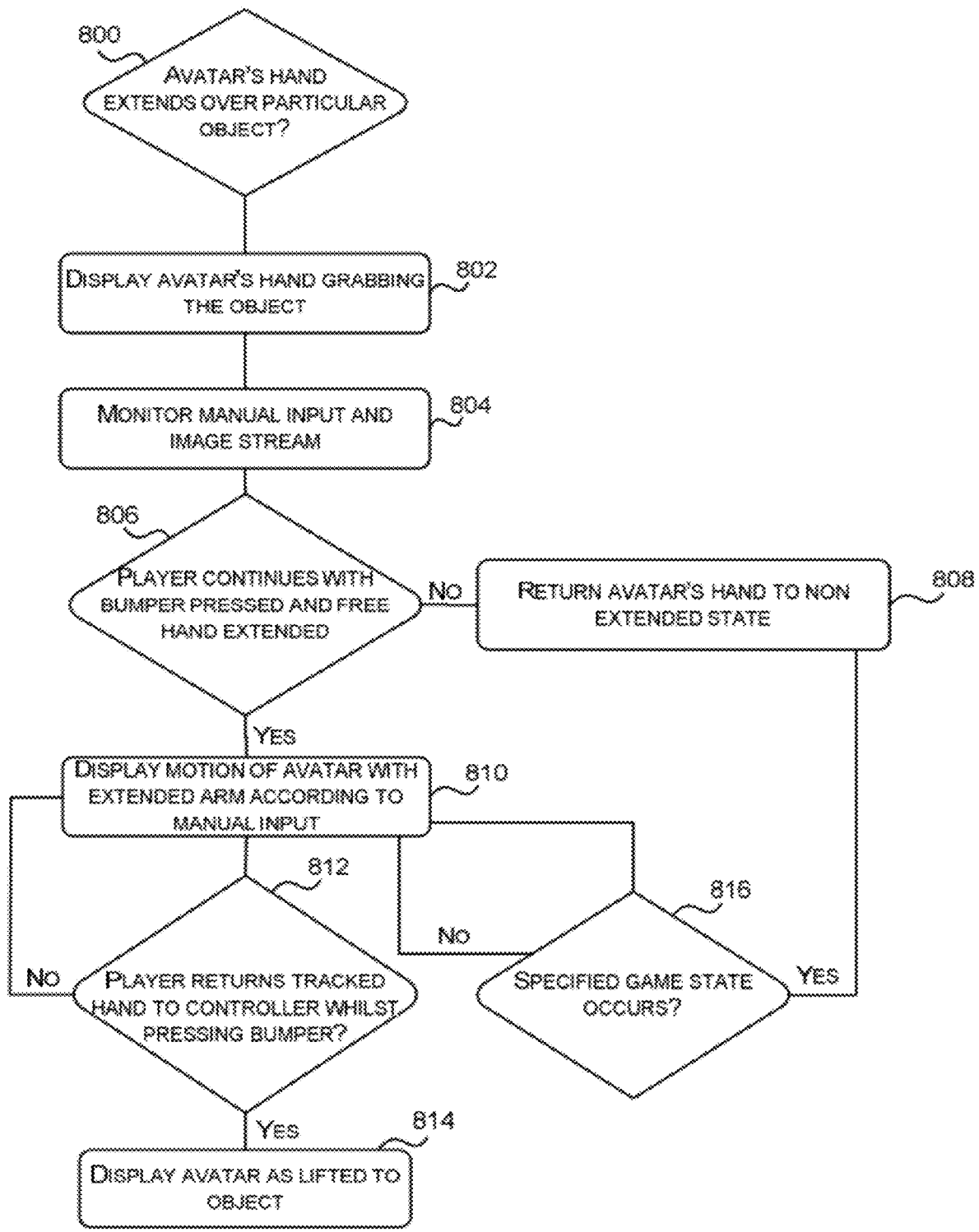
FIG. 8 is a flow diagram of a method of operation of a game system for use in conjunction with the method of FIG. 7.

With reference to FIG. 8 a check 800 may be made as to whether the avatar's hand (after extension to the mapped position in screen space) is over a particular object (such as the door handle of FIG. 5). If so, the avatar's hand may be displayed 802 as grabbing the particular object. Tracking of the player's free hand and manual input continues 804 and a check 806 is made as to whether the player continues with the bumper pressed and their free hand extended. If not, the avatar's hand is returned 808 to the non extended state. If the player continues with the bumper depressed and the free hand extended it may be possible for the player to move the avatar whilst the avatar's arm remains extended. For example, by making input at a joystick on the controller. Motion of the avatar is displayed 810 whilst the avatar's arm is extended and according to manual input by the player. For example, in this state, the player may use their thumb to control the avatar so that it runs around with one arm stretching and rotating to stay grabbing the object.

If the player returns the tracked hand to the controller whilst pressing the bumper 812 then the avatar may be displayed 814 as being lifted to the object. If the player releases the bumper then the avatar's hand may return to the non extended state. If a specified game state occurs 816 the avatar's hand may return 808 to the non extended state. For example, the specified game state may be a wound from an enemy, the avatar moving more than a threshold distance away from the object being grabbed, a specified time is reached, a specified power meter level is reached.

In other examples the camera-based input is used to control the direction of an avatar's sword swing. In another example, the camera-based input is used to aim a gun at a point on a map and the manual input is used to pull the trigger of the gun. In various examples described herein the body part position or movement made by the player is analogous to the control of the avatar made in the game. For example, a player may reach upwards with one hand and their action is copied by the avatar in the game in an amplified or exaggerated manner. However, this is not essential. The movement made by the player may be unrelated to the control of the avatar which results.

Figure 9:
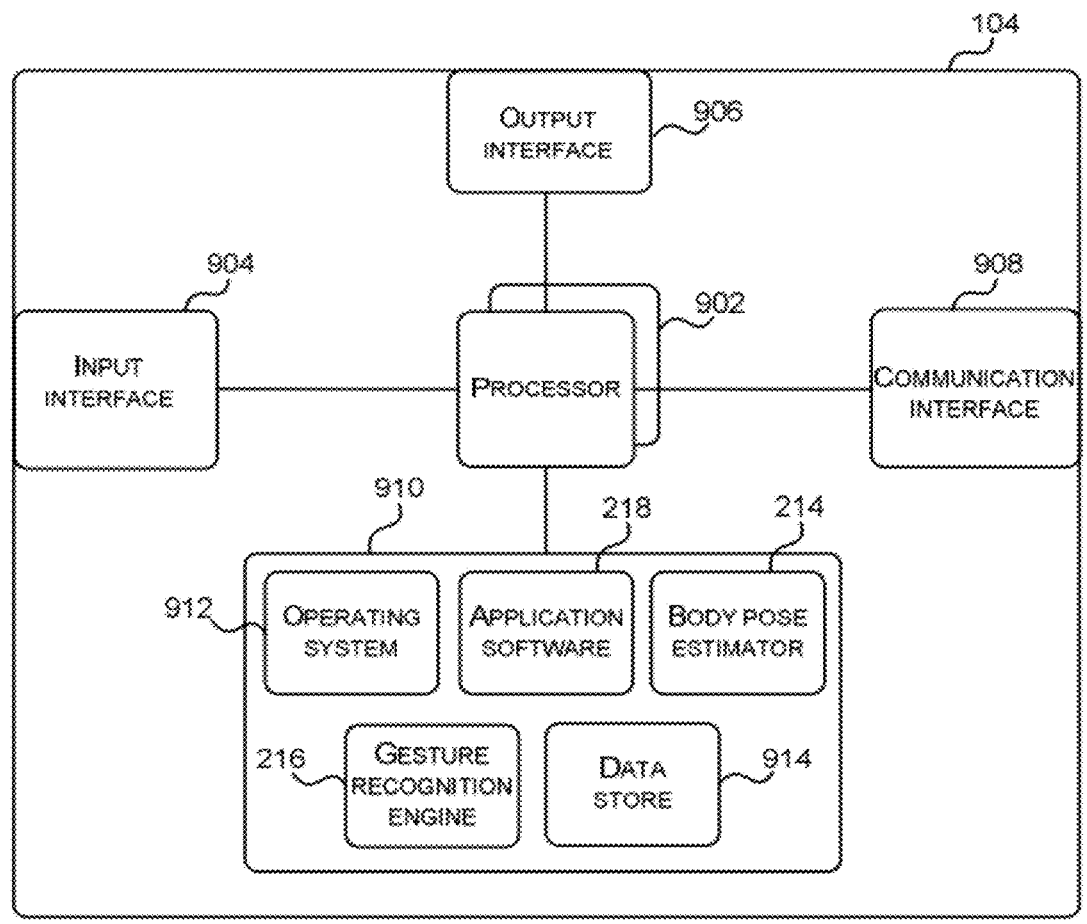
FIG. 9 illustrates an exemplary computing-based device in which embodiments of a game system may be implemented.

FIG. 9 illustrates various components of an exemplary computing device 104 which may be implemented as any form of a computing and/or electronic device, and in which embodiments of the above-described game control techniques may be implemented.

Computing device 104 comprises one or more processors 902 which may be microprocessors, controllers or any other suitable type of processors for processing computing executable instructions to control a game system. In some examples, for example where a system on a chip architecture is used, the processors 902 may include one or more fixed function blocks (also referred to as accelerators) which implement a part of the game control methods in hardware (rather than software or firmware).

The computing-based device 104 also comprises an input interface 904 arranged to receive input from one or more devices, such as the capture device 106 of FIG. 2 and/or the controller of FIG. 3 and FIG. 4. An output interface 906 is also provided and arranged to provide output to, for example, a display system integral with or in communication with the computing-based device (such as display device 108 or 220). The display system may provide a graphical user interface, or other user interface of any suitable type although this is not essential. A communication interface 908 may optionally be provided, which can be arranged to communicate with one or more communication networks (e.g. the internet).

The computer executable instructions may be provided using any computer-readable media that is accessible by computing based device 104. Computer-readable media may include, for example, computer storage media such as memory 910 and communications media. Computer storage media, such as memory 910, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media (memory 910) is shown within the computing-based device 104 it will be appreciated that the storage may be distributed or located remotely and accessed via a network or other communication link (e.g. using communication interface 908).

Platform software comprising an operating system 912 or any other suitable platform software may be provided at the computing-based device to enable application software 218 to be executed on the device. The memory 910 can store executable instructions to implement the functionality of the body pose estimator 214 and the gesture recognition engine 216. The memory 910 can also provide a data store 914, which can be used to provide storage for data used by the processors 902 when performing the game control techniques, such as for any stance templates, thresholds, parameters, screen space mapping functions, or other data.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of controlling a computer game system comprising:
    receiving a stream of images from an image capture device depicting at least one player of a game;
    determining a part position of the player by analyzing the stream of images;
    receiving player manual input from a hand operated controller operated by the player;
    displaying a computer game at a display being viewed by the at least one player the display comprising at least one avatar and an environment;
    checking that a plurality of player conditions are met, at least one of the conditions being the player having only one hand on the hand operated controller or the player having one hand greater than a threshold distance away from the controller; and
    controlling the display of the avatar, once the player conditions are met, on the basis of both the determined player part position and the manual input from the controller.

2. A method as claimed in claim 1 wherein the part position of the player is a body part position of the player or a position of a real world object held by the player.

3. A method as claimed in claim 1 comprising mapping the determined part position of the player to a mapped position in screen space using a mapping function and controlling the display of the avatar in relation to the mapped position in screen space.

4. A method as claimed in claim 2 comprising controlling the display of the avatar by extending a part of the avatar towards the mapped position in screen space.

5. A method as claimed in claim 2 comprising controlling the display of the avatar by moving the avatar towards the mapped position in screen space.

6. A method as claimed in claim 1 comprising tracking the part position of the player and controlling the display of the avatar on the basis of the tracked part position.

7. A method as claimed in claim 1 comprising tracking the part position of the player; mapping the tracked part position of the player to a mapped plurality of positions in screen space using a mapping function and controlling the display of the avatar in relation to the mapped positions in screen space.

8. A method as claimed in claim 1 wherein checking that a plurality of player conditions are met comprises checking that the player has only one hand on the hand operated controller.

9. A method as claimed in claim 8 wherein the plurality of conditions comprise checking that the player has one hand greater than a threshold distance away from the controller.

10. A method as claimed in claim 9 wherein the plurality of conditions are checked using only the received stream of images.

11. A method as claimed in claim 9 wherein the plurality of conditions are check using both the received stream of images and the manual input.

12. A method as claimed in claim 3 comprising changing parameters of the mapping function according to a state of the game.

13. A computer game system comprising:
   an image capture device arranged to receive a stream of images depicting at least one player of a game;
   a processor arranged to determine a part position of the player by analyzing the stream of images;
   an input arranged to receive player manual input from a hand operated controller;
   the processor being arranged to check that a plurality of player conditions are met, at least one of the conditions being the player having only one hand on the hand operated controller or the player having one hand greater than a threshold distance away from the controller;
   an output arranged to display a computer game at a display being viewed by the at least one player, the display comprising at least one avatar and an environment; and
   the processor being arranged to control the display of the avatar, once the player conditions are met, on the basis of both the determined player part position and the manual input from the controller
   the processor being arranged to control the display of the avatar~when the player conditions are not met on the basis of the manual input from the controller.

14. A computer game system as claimed in claim 13 wherein the processor is arranged to track the part position of the player and control the display of the avatar on the basis of the tracked part position.

15. A computer game system as claimed in claim 13 wherein the processor is arranged to track the part position of the player; map the tracked part position of the player to a mapped plurality of positions in screen space using a mapping function and control the display of the avatar in relation to the mapped positions in screen space.

16. A computer game system as claimed in claim 13 wherein the processor is arranged to check of the player conditions by checking at least that the player has only one hand on the hand operated controller.

17. A computer game system as claimed in claim 16 wherein the plurality of conditions comprise checking that the player has one hand greater than a threshold distance away from the controller.

18. A computer game system as claimed in claim 16 wherein the plurality of conditions are checked using only the received stream of images.

19. A method of controlling a computer game system comprising:
   receiving a stream of images from an image capture device depicting at least one player of a game;
   tracking motion of a part of the player by analyzing the stream of images;
   receiving player manual input from a hand operated controller operated by the player;
   displaying a computer game at a display being viewed by the at least one player the display comprising at least one avatar and an environment;
   checking that the player has only one hand on the hand operated controller and that the player has one hand greater than a threshold distance away from the controller and if so,
   controlling the display of the avatar on the basis of both the tracked motion of a part of the player and the manual input from the controller.

20. A method as claimed in claim 19 wherein the part position of the player is a body part position of the player or a position of a real world object held by the player.

* * * * *